Figure 1:
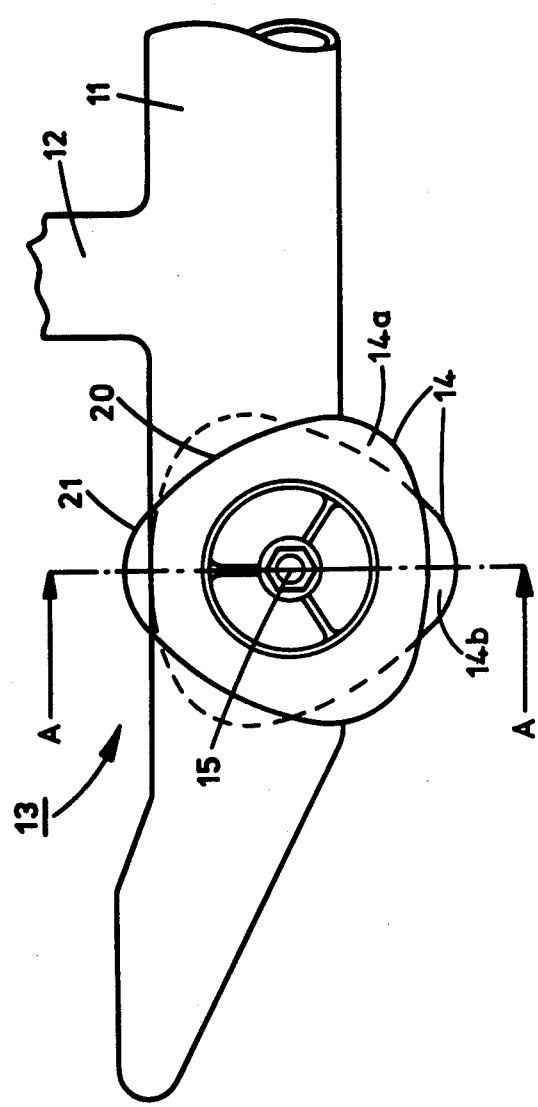

United States Patent [19]

Reid

[11] 4,102,423
[45] Jul. 25, 1978

[54] GROUND TRACTION DEVICES

[75] Inventor: Peter Reid, Hardington Mandeville, Near Yeovit, England

[73] Assignee: Westland Aircraft Limited, Yeovil, England

[21] Appl. No.: 800,848

[22] Filed: May 26, 1977

[30] Foreign Application Priority Data

May 28, 1976 [GB] United Kingdom .............. 22461/76

[51] Int. Cl.² ............................................. B62D 57/00
[52] U.S. Cl. ................................ 180/7 R; 152/352 R; 244/50; 244/103 R; 301/41 R; 305/34
[58] Field of Search ................ 244/50, 100 R, 103 R, 244/103 S, 105, 108, 17.17, 101; 115/19, 1 R; 180/7 R; 152/352; 301/5 R, 41 R; 305/34

[56] References Cited

U.S. PATENT DOCUMENTS

| 2,256,570 | 9/1941 | Kopczynski | 180/7 R |
| 2,460,387 | 2/1949 | Hunter | 244/50 |
| 2,500,577 | 3/1950 | Sands, Jr. | 244/103 S |
| 2,692,096 | 10/1954 | Pierce | 244/108 |
| 2,711,221 | 6/1955 | Kopczynski | 180/7 R |
| 2,790,503 | 4/1957 | Kopczynski | 180/7 R |
| 2,819,767 | 1/1958 | Kopczynski | 180/7 R |
| 3,279,722 | 10/1966 | Glover, Jr. et al. | 244/50 |
| 3,372,766 | 3/1968 | Liffertl | 152/352 |

Primary Examiner—Galen L. Barefoot
Attorney, Agent, or Firm—Larson, Taylor and Hinds

[57] ABSTRACT

A ground traction device is disclosed which comprises ground engaging members including first and second parts, the parts being mounted for rotation on a fixed axis and being rotationally offset with respect to each other about the axis. The peripheral surface of each part includes three individual areas arranged in the form of an equilateral triangle with ends of adjacent areas being joined by lobe portions. The ground engaging portions are constructed of molded rubber and provide improved traction in soft ground. The properties of the rubber are selected in relation to the weight of a vehicle to be moved so that the ground engaging member rotates about a true rolling radius over hard ground.

10 Claims, 5 Drawing Figures

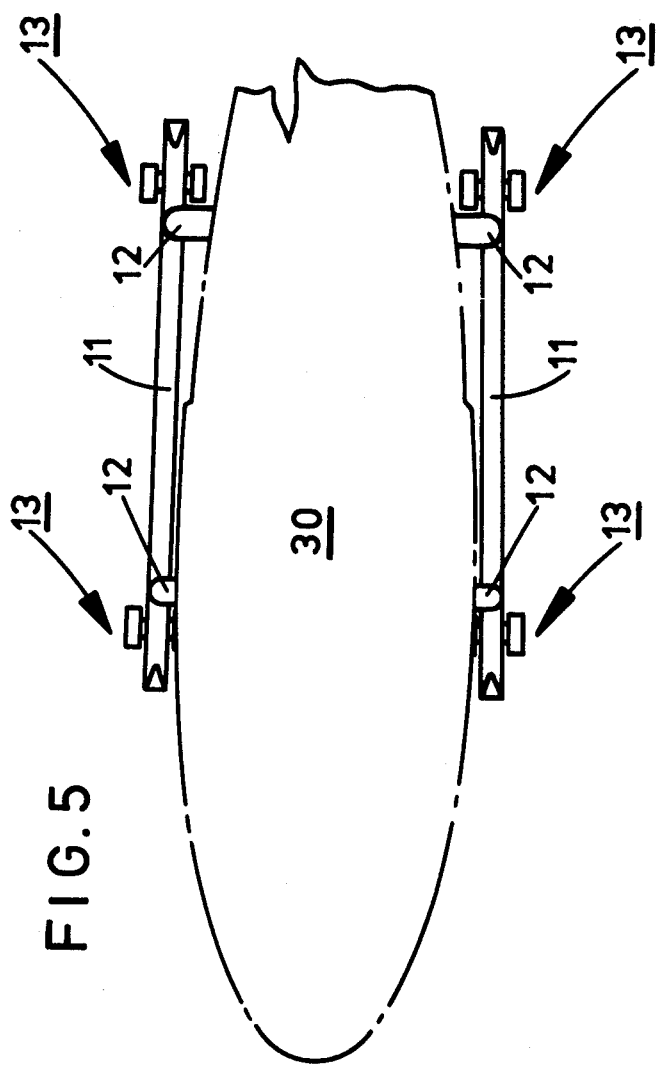

GROUND TRACTION DEVICES

THIS INVENTION relates to ground traction devices, and particularly to such devices for operation over soft ground. The invention is applicable to many different types of vehicle or structure that it is desired to move, but for convenience it is described herein in its application to a helicopter fitted with a skid-type undercarriage.

In operation, helicopters having such undercarriages may be required to land on unprepared soft ground that is incapable of supporting the weight of the helicopter as applied by the skids, so that the skids sink into the surface and make the fitment of ground handling wheels difficult or impossible. Even if it were possible to fit the ground handling wheels, movement of the helicopter would necessitate some form of towing apparatus which may itself be restricted, due to the soft ground state. Furthermore, in some operational environments such towing apparatus either may not be available or its use may not be convenient.

Conventional wheeled attachments are not suitable for permanent fitment to the skids, due to the relatively large size which would be required to support the weight of the helicopter on soft ground and the inevitable drag penalty caused thereby during flight.

Accordingly, in its broadest aspect, the invention provides a ground traction device including a ground engaging member arranged for rotation about an axis and having a peripheral ground engaging surface generated by motion of a line generally parallel to said axis, and in a path comprising a plurality of individual arcs each of a similar radius that is greater than the shortest distance between the axis and the generated surface.

Ends of adjacent arcs may be blended together so as to provide curved lobe portions having a radius preferably less than the distance between the axis of rotation and the generated surface.

Preferably, the ground engaging member comprises first and second parts having similar peripheral shapes, the parts being rotationally fixed to each other and rotationally offset about the said axis of rotation. The first and second parts may be axially spaced-apart and may be connected to a common drive shaft, and means may be provided to rotate the shaft so as to cause simultaneous rotation of the first and second parts of the ground engaging member.

The ground engaging member is, preferably, constructed of rubber, and the properties of the rubber may be selected in relation to the weight of a structure to be moved so that, when operating on a hard surface, the ground engaging member behaves as a generally circular wheel of constant radius.

In a preferred embodiment of the invention, the peripheral surface of each of the first and second parts is generated by three individual arcs arranged generally in the form of an equilateral triangle, the first and second parts of the ground engaging member being rotationally offset, conveniently, by approximately 60°. Preferably, the radius of each arc is at least twice the said shortest distance dimension, and in the particular embodiment described below is 235 percent of said distance dimension. The radius of lobe portions at the junctions between said arc-generated portions is, preferably, approximately one half of said distance dimension.

In another aspect the invention extends to a vehicle fitted with at least one ground traction device of the aforesaid construction. The vehicle may comprise a helicopter that may be fitted with a skid undercarriage comprizing two laterally arranged tubular skids supported from a fuselage and generally parallel to a longitudinal centreline thereof. Conveniently, in such an arrangement, a ground traction device may be provided adjacent each end of each skid, each device having, preferably, first and second parts of a ground engaging member located on opposite sides of its respective skid and connected by a common drive shaft extending through the skid. A power unit and transmission system may be located within the tubular skid for each device, and may be operatively associated with the drive shaft. Power and control supplies may be routed through hollow struts supporting each skid, and control means may be provided in the helicopter to effect independent rotation of the ground traction devices at variable speeds and in both directions of rotation.

In yet another aspect the invention provides a helicopter having a skid undercarriage comprizing two lateral tubular skids supported from a fuselage and generally parallel to a longitudinal centreline thereof, a ground traction device attached adjacent both ends of each tubular skid, each device including a ground engaging member arranged for rotation about an axis and comprising first and second parts located respectively at opposite sides of the skid, each part having a peripheral surface generated by motion of a line about an axis of rotation, parallel with said line, in a path comprized of three arcs of similar radius and arranged generally in the form of an equilateral triangle, the radius being of greater dimension than the shortest distance between the axis of rotation and any point on the surface, the first and second parts of the ground engaging member being rotationally fixed at the ends of a drive shaft extending through the tubular skid and being offset rotationally with respect to each other by approximately 60°, a power source and transmission means located within the tubular skid and operatively associated with said drive shaft so as to cause simultaneous rotation of the first and second parts of the ground engaging member.

Figure 2:
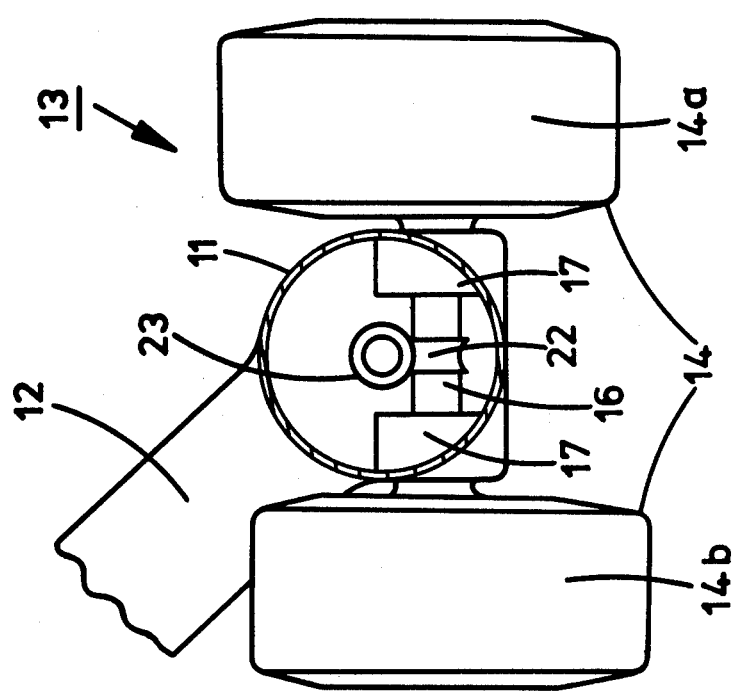
Figure 3:
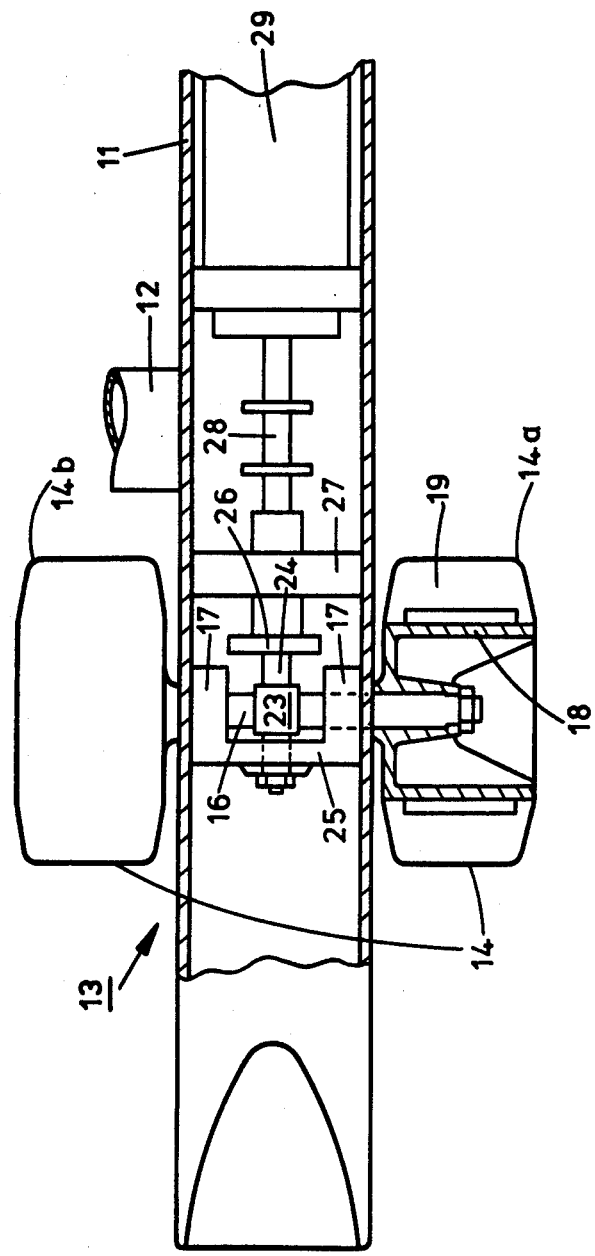
Figure 4:
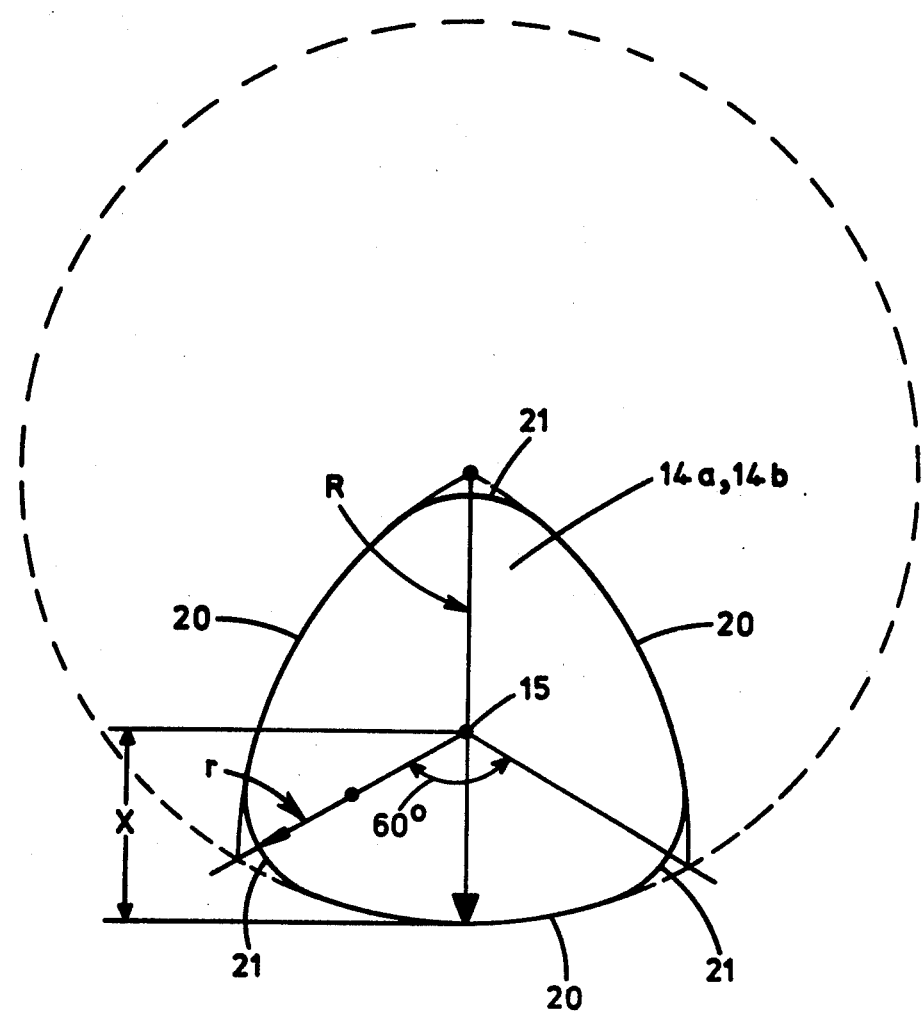

The invention will now be described by way of example only and with reference to the accompanying drawings, in which:

FIG. 1 is a fragmentary side elevation of one end of a helicopter skid undercarriage fitted with a ground traction device constructed in accordance with one embodiment of the invention, FIG. 2 is a part sectioned view taken on lines A—A of FIG. 1, FIG. 3 is a part sectioned planview of FIG. 1, FIG. 4 is a detail view of a part of the ground traction device, and FIG. 5 is a fragmentary planview of a helicopter having a skid undercarriage fitted with ground traction devices according to the invention.

Referring to FIGS. 1, 2 and 3, a tubular skid 11 forming part of a helicopter skid undercarriage is attached to a helicopter (not shown) by at least one tubular strut 12.

A ground traction device, generally indicated at 13, is located adjacent one end of the skid 11 and comprises a ground engaging member 14 arranged for rotation about an axis 15. The ground engaging member 14 comprizes two coaxially arranged parts, 14a and 14b respectively, located one at each side of the skid 11 and rotationally fixed to a shaft 16 supported in bearings (not shown) located in housings 17 formed in the skid 11.

Each part 14a and 14b of the ground engaging member 14 comprizes a hub 18 and a moulded rubber tire 19, the tire 19 having a peripheral surface that, in any plane perpendicular to the shaft axis 15, is generated by motion of a line generally parallel to the axis 15 and in a plane including three arcs 20 comprising individual circularly arcuate portions that provide main ground engaging surfaces. The circularly arcuate portions 20 are arranged in the form of an equilateral triangle, and adjacent ends of arcuate portions 20 are joined by curved lobe portions 21 (FIG. 1). The parts 14a and 14b are rotationally offset by approximately 60° so that the lobe portions 21 of one of the parts 14a or 14b are located generally centrally of the arcuate portions 20 that define the other part 14b or 14a.

The surfaces of the arcuate portions 20, and lobe portions 21, are generally smooth and flat and extend throughout substantially an entire width dimension of each part 14a and 14b and generally parallel to the axis of rotation 15.

The constructional features of the parts 14a and 14b of the ground engaging member 14 will be described in detail hereinafter.

A worm wheel 22 is located centrally of the shaft 16 and meshes with a worm gear 23 on a shaft 24, one end of which is located in a bearing (not shown) supported in a cross member 25 in the skid 11. The other end of the shaft 24 is connected to a clutch 26 that in turn is connected to a high ratio reduction gear in the form of a harmonic drive unit 27. A flexible drive shaft 28 connects the harmonic drive unit 27 to an electric motor 29 mounted inside the skid 11. Electrical supplies and control cables (not shown) are routed through the hollow strut 12 from the helicopter.

FIG. 4 provides details of the constructional features of each of parts 14a and 14b of the ground engaging member 14.

In constructing a ground traction device according to the present invention it is first necessary to determine a desired minimum ground clearance between the bottom of the hard structure (e.g. skid 11) and the surface generated by the circularly arcuate portions 20. It is then possible to determine dimension X that comprizes the rolling radius or shortest distance between the axis of rotation 15 and any point on the surface of the ground engaging member. The position of the individual circularly arcuate portions 20 in then fixed by striking a radius R of at least twice dimension X, and joining adjacent arcuate portions 20 by lobe portions 21 having a radius r of about half of dimension X.

In a preferred embodiment, radius R is calculated as 235 percent of dimension X, and radius r is calculated as 56.15 percent of dimension X.

As an example only, for a particular installation, dimension X was calculated as 4.0 inches in order to provide a ground clearance of 2.45 inches. Radius R is then fixed at 9.40 inches (i.e., 4.0 times 235 percent) and radius r at 2.24 inches (i.e., 4.0 times 56.15 percent). Each of parts 14a and 14b has a width dimension of approximately 4.0 inches. Tire 19 was moulded of rubber having a shore hardness of 45° I.R.H.D., although it is considered that a shore hardness of 30° I.R.H.D. is probably a minimum for successful operation of the device. The selection of a suitable rubber hardness is clearly dependent on variables such as the weight of an object to be moved and the actual sizing and width of each of the portions 14a and 14b.

FIG. 5 is a fragmentary planview of a helicopter having a fuselage 30 and a skid undercarriage comprizing two longitudinally extending tubular skids 11 each being supported from the fuselage 30 by two tubular struts 12. A ground traction device 13 constructed as hereinbefore described is located adjacent both ends of each tube 11.

Each ground traction device 13 is driven by an individual motor 29 (FIG. 3), that is controlled from within the helicopter fuselage 30 so as to be capable of operating at varying speeds and in both directions of rotation, thereby providing ground mobility and directional control of the helicopter.

Again, as an example only, in the particular installation described, each motor 29 is a one half h.p. motor designed to operate at 7,900 r.p.m. from a 27V d.c. electrical power supply. The harmonic drive unit 27 and worm wheel 23 and gear 22 are designed to reduce the speed at the output shaft 16 to about 3 r.p.m., thereby providing for a high torque output. It is calculated that such an arrangement will be capable of moving a helicopter having a gross weight of about 10,000 lb. at a speed of approximately 6 feet per minute. It will be appreciated that, in operation, the clutch 26 is designed to protect the transmission and the motor 29 in the event of a run-on landing.

In operation of the ground traction device constructed in accordance with the invention, the geometrical features of the parts 14a and 14b in which the circularly arcuate portions 20 have a relatively large radius which, combined with the width thereof, provides a good ground contact area that is rotated about an axis 15 positioned much closer to the surface of the portions 20 than is possible if a true circular wheel were used.

Thus, in the aforementioned example, the arcuate portions 20 have a radius R of 9.40 inches, corresponding to an 18.80 inch diameter wheel, yet the axis of rotation 15 is positioned at only 4.0 inches from the closest point on the surface of each of the arcuate portions 20.

In the case of a circular wheel of comparable dimensions, the driving torque is applied at the centre of the rotational radius, i.e., 9.40 inches from its periphery, and the tractive effort is measured at the periphery so that the soil of the ground surface is in shear due to the tractive effort acting parallel to the ground surface. However, in the present invention, even though the radius of each circular arcuate portion 20 is the same as that of an 18.80 inch diameter wheel, the rotational radius, i.e., axis 15, is only 4.0 inches from the closest point on the surface of each arcuate portion 20, which means that the relationship between the surfaces of the arcuate portions 20 and the ground surface is a tramping action rather than a shearing action. Thus, the soil of the ground surface is compressed prior to the entry of the curved driving lobes 21 and the onset of true tractive effort.

In relating this action to the 60° offset of parts 14a and 14b of each ground engaging member 14 as hereinbefore described, it will be apparent that as a lobe 21 of part 14a sinks into the ground to provide tractive effort, the surface of one of the arcuate portions of part 14b tramps the surface and compresses it prior to its following lobe 21 entering the ground to continue the traction. As a lobe 21 of one part 14a enters the ground, an arcuate portion 20 of the other part 14b is tramping the surface and vice-versa, so that a rolling radius is established around the surfaces of the arcuate portions 20 of the parts 14a and 14b respectively. Due to the shape of the lobes 21 and the action of digging into the ground, the soil is further compressed, thus improving ground resistance to tractive effort applied by the ground engaging member.

On firmer ground where less area of ground contact is required in order to react the same tractive effort the penetration of the lobes 21 will be less, due to partial compression of the rubber tire 19. This compression plus the soil penetration will ensure that the surfaces of arcuate portions 20 will bear on the ground surface so that a rolling radius is again automatically established.

As previously mentioned, for operation on a hard surface, the properties of the tire 19, such as the hardness of the rubber, are selected in relation to the weight of a structure to be moved so that the smaller cross-sectional area of the lobes 21 are compressed to the same rolling radius as the arcuate portions 20.

It will be apparent that when the part, say 14a, is in the position shown in FIG. 4, minimal compression takes place due to the relatively large cross-sectional area of the tire 19 that is in contact with the surface. However, as the part 14a revolves about axis 15 a gradually decreasing cross-sectional area is in contact with the surface so that compression of the rubber increases until a maximum is reached when the lobe 21 is centred on the ground surface. This automatic variation in degree of compression encountered as the parts 14a and 14b rotate results in a common true rolling radius being achieved on a hard surface so that the ground engaging member acts as a circular wheel having a radius corresponding approximately with dimension X.

Therefore, the ground engaging member 14 of the device of the present invention retains the benefits of a circular wheel for operation over hard surfaces and exhibits much improved tractive properties when operating over soft ground. Furthermore, circular tractive wheels normally rely on a tread pattern to produce traction in soft ground, and these are very prone to becoming choked with mud, thereby seriously impairing efficiency. The ground engaging member 14 of the present invention overcomes this problem since, as it does not rely on a tread pattern to produce tractive effort, the surfaces can be relatively smooth and flat, thus also simplifying manufacture. This, together with a relatively slow operating speed, also minimizes degradation of the ground surface that is a common problem with conventional wheeled devices.

In its particular application to the movement of a helicopter as hereinbefore described, the present invention provides a further significant advantage over conventional circular wheels. Thus, the ground engaging member 14 exhibits a fore-and-aft profile that is less than half that of a conventional wheel having a comparable operating diameter as shown in broken line in FIG. 5, thereby incurring a significantly reduced drag penalty during operation.

Whilst one embodiment of the invention has been described and illustrated it will be understood that many modifications can be made without departing from the scope of the appended claims. For example, the rotationally offset parts 14a and 14b of the ground engaging member 14 may be of any other suitable shape such as two or four-sided. The parts 14a and 14 b need not be axially spaced-apart as illustrated, but could be arranged in surface to surface contact. Alternatively, the tire 19 of each part 14a and 14b may be moulded as an integral assembly and fitted to a common hub. The ground traction device 13 may be constructed as a permanent attachment to any structure that it is desired to move over soft ground as in the application hereinbefore described, or alternatively, it could be constructed as a self-contained module for selective attachment to such a structure.

If desired, each of the parts 14a and 14b may be provided with a tread that may, preferably, comprize a single raised tread located adjacent the apex of each lobe 21. The single raised tread will not be subject to clogging and will further enhance the tractive capabilities of the device.

Modifications may also be made to the particular application of the ground traction device to a helicopter as hereinbefore described. Thus, again, each device may comprize a self-contained module for selective attachment to the helicopter undercarriage, which itself is not limited to being of the skid type. For example, a self-contained module may be arranged for selective fitment to existing undercarriage oleo struts to improve manoeuvrability in poor ground conditions. Provision may also be made for connecting an external power supply and control system so that movement of the helicopter, or other structure, can be controlled externally thereof.

I claim as my invention:

1. A ground traction device comprising, in combination, a fixed axis, ground engaging means mounted for rotation on said fixed axis, means for rotating said ground engaging means on said axis, said ground engaging means including first and second parts, each part having a peripheral surface comprised of a plurality of individual arcs each of similar radius that is greater than a shortest distance between said axis and said surface, curved lobe portions blending ends of adjacent arcs and having a radius less than said distance, said first and second parts comprising solid rubber tires rotationally fixed with respect to each other and rotationally offset about said axis, said rubber tires being constructed of a rubber having a hardness selected in relation to a weight of a structure to be moved so that when operating over hard ground, the curved lobe portions are automatically compressed to assume a radius approximating that of the arcuate portions, whereby said ground engaging means operates automatically as a circular wheel when moving over hard ground.

2. A device as claimed in claim 1, wherein said first and second parts are axially spaced-apart.

3. A device as claimed in claim 2, wherein said first and second parts are connected by a common drive shaft, and means for rotating said drive shaft so as to cause simultaneous rotation of said first and second parts of said ground engaging member.

4. A device as claimed in claim 2, wherein said first and second parts have similar peripheral shapes comprising three individual arcs arranged in the form of an equilateral triangle, said parts being rotationally fixed to each other and rotationally offset about said axis by approximately 60°.

5. A vehicle having at least one ground traction device, the device including, in combination, a fixed axis, ground engaging means arranged for rotation about said axis and comprising first and second axially arranged parts, each of the first and second parts having a peripheral ground engaging surface generated by motion of a line generally parallel to said axis and in a path comprising a plurality of individual arcs each having a similar radius that is greater than a shortest distance between said axis and the generated surfaces, ends of adjacent arcs being blended by lobe portions having a radius less than said distance, said first and second parts being rotationally fixed to each other and rotationally offset about said axis, means for rotating said ground engaging member and means operatively associated with said first and second parts so that when operating over hard ground, the curved lobe portions are automatically compressed to assume a radius approximating that of said arcs whereby said ground engaging means operates automatically as a circular wheel when moving over hard ground.

6. A vehicle as claimed in claim 5, wherein the peripheral surface of each of said first and second parts of the ground engaging member comprises three individual arcs arranged in the form of an equilateral triangle, said first and second parts being rotationally offset by approximately 60°.

7. A vehicle as claimed in claim 5 and comprising a helicopter having a skid undercarriage including two laterally arranged tubular skids supported from a fuselage and generally parallel to a longitudinal centreline thereof, a ground traction device being provided adjacent each end of each skid.

8. A vehicle as claimed in claim 7, wherein said first and second parts of the ground engaging means of each device are located on opposed sides of each skid, said parts being rotationally fixed to a rotatable drive shaft extending through said skid, the means for rotating each ground engaging member including a power unit and transmission system located within the tubular skids.

9. A vehicle as claimed in claim 8, wherein power and control supplies are routed through hollow struts supporting said tubular skids from said fuselage.

10. A vehicle as claimed in claim 9, wherein control means are provided in the vehicle to effect independent rotation of said ground traction devices at variable speed and in both directions of rotation.

* * * * *